United States Patent
Anastasio

(10) Patent No.: US 10,602,683 B2
(45) Date of Patent: Mar. 31, 2020

(54) THERMALLY REGULATED ENCLOSURE SYSTEM

(71) Applicant: DFA Holdings, LLC, Fort Collins, CO (US)

(72) Inventor: David F. Anastasio, Fort Collins, CO (US)

(73) Assignee: DFA Holdings, LLC, Fort Collins, CO (US)

( * ) Notice: Subject to any disclaimer, the term of this patent is extended or adjusted under 35 U.S.C. 154(b) by 274 days.

(21) Appl. No.: 15/610,457

(22) Filed: May 31, 2017

(65) Prior Publication Data

US 2017/0359968 A1     Dec. 21, 2017

Related U.S. Application Data

(60) Provisional application No. 62/351,420, filed on Jun. 17, 2016.

(51) Int. Cl.
*A01G 27/00*     (2006.01)

(52) U.S. Cl.
CPC .................................. *A01G 27/00* (2013.01)

(58) Field of Classification Search
CPC .................. A01G 27/00; A01G 9/1438; A01G 2009/1446; A01G 2009/1453; A01G 2009/1461; A01G 9/247; A01G 13/02; A01G 13/0206; A01G 13/0212; A01G 13/0225; A01G 13/0243; A01G 13/0281; A01G 13/0293; A01G 13/105; A01G 13/10; A01G 15/00

USPC ....... 47/21.1, 19.1, 19.2, 30, 20.1; D30/154; 135/118; 172/24; 52/157; 40/607; 273/407

See application file for complete search history.

(56) References Cited

U.S. PATENT DOCUMENTS

| | | | | |
|---|---|---|---|---|
| 2,226,812 A | | 12/1940 | Goldberg | |
| 3,226,881 A | * | 1/1966 | Garrett | A01G 13/04 47/30 |
| 4,711,051 A | * | 12/1987 | Fujimoto | A01G 13/04 47/29.2 |
| 5,505,020 A | * | 4/1996 | North | A01G 13/04 47/29.2 |
| 5,669,177 A | * | 9/1997 | Frounfelker | A01G 13/04 47/29.2 |
| 6,233,868 B1 | * | 5/2001 | Hahn | A01G 13/10 47/30 |

(Continued)

OTHER PUBLICATIONS

U.S. Appl. No. 62/351,420, filed Jun. 17, 2016.

(Continued)

*Primary Examiner* — John Cooper
(74) *Attorney, Agent, or Firm* — Craig R. Miles; CR Miles P.C.

(57) ABSTRACT

A thermally regulated enclosure system which includes apparatuses and methods of making and using a thermally regulated enclosure system, including one or more of a vessel having a bottom aperture element which defines a bottom open area, a top aperture element which defines a top open area, one or more stakes detachably fastenable to the peripheral margin of the bottom aperture element of the vessel, and a closure element adjustable in relation to the top aperture element to increase or decrease the top open area.

20 Claims, 14 Drawing Sheets

(56) References Cited

U.S. PATENT DOCUMENTS

| | | | |
|---|---|---|---|
| 7,159,256 B1 * | 1/2007 | Licari | E04H 15/003 |
| | | | 135/118 |
| 7,739,831 B2 * | 6/2010 | Frounfelker | A01G 13/04 |
| | | | 47/19.2 |
| 2005/0091746 A1 * | 5/2005 | Clouston | E04H 15/62 |
| | | | 5/417 |

OTHER PUBLICATIONS

Wikihow. How to Make Garden Hot Caps from Used Milk Jugs. Website, http://www.wikihow.com, originally downloaded Dec. 29, 2015, 6 pages total.

* cited by examiner

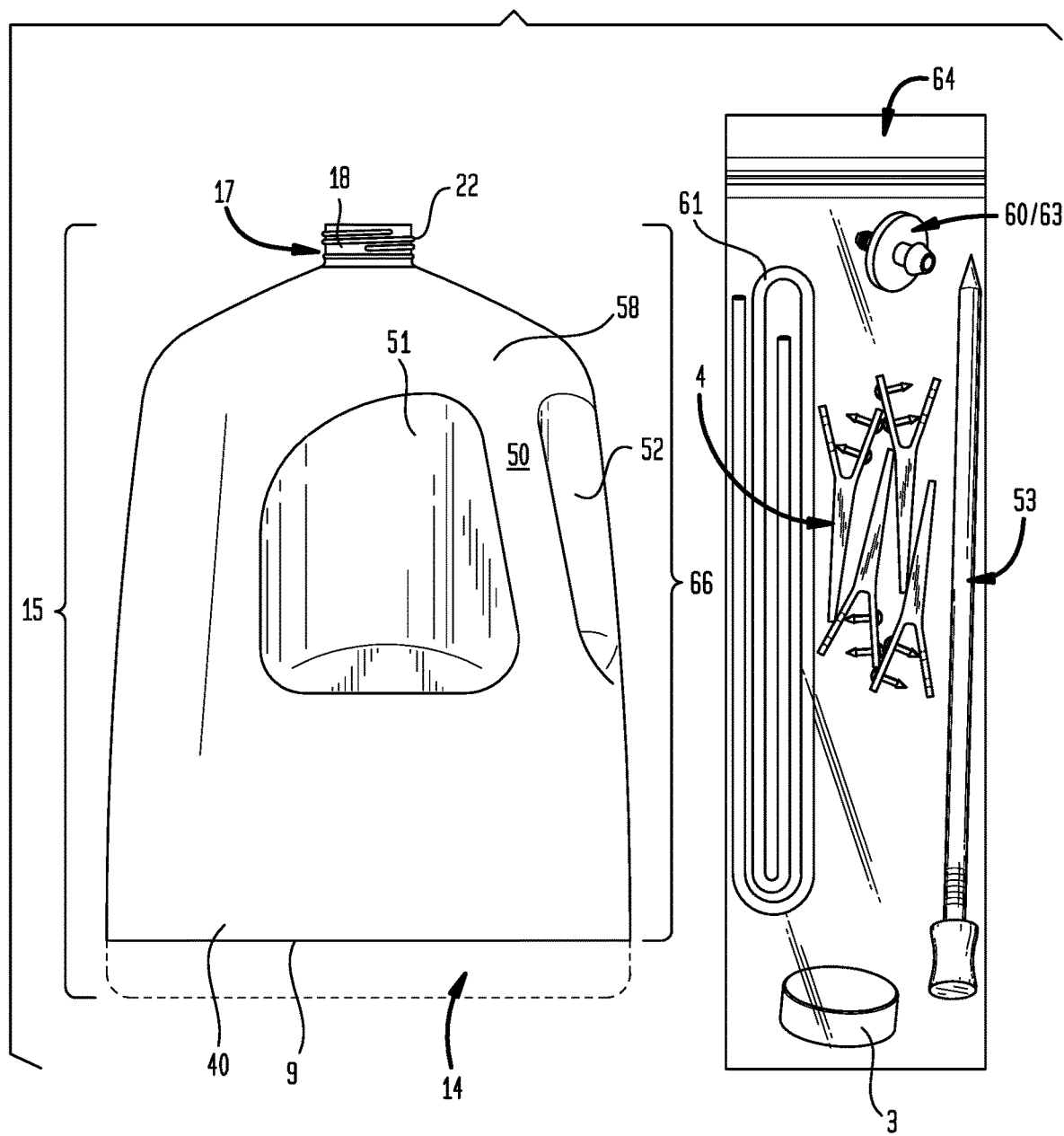

US 10,602,683 B2

THERMALLY REGULATED ENCLOSURE SYSTEM

This U.S. Non-Provisional Patent Application claims the benefit of U.S. Provisional Patent Application No. 62/351,420, filed Jun. 17, 2016, hereby incorporated by reference herein.

I. TECHNICAL FIELD

A thermally regulated enclosure system which includes apparatuses and methods of making and using a thermally regulated enclosure, including one or more of a vessel having a bottom aperture element which defines a bottom open area, a top aperture element which defines a top open area, one or more stakes detachably fastenable to the peripheral margin of the bottom aperture element of the vessel, and a closure element adjustable in relation to the top aperture element to increase or decrease the top open area. A kit to make a thermally regulated enclosure system including one or more stakes detachably fastenable to a vessel made from a container having the bottom portion removed. The thermally regulated enclosure system can be positioned on a support surface to enclose a protected object with the stakes penetrating the support surface to positionally secure the vessel, and the closure element can be coupled to the vessel to adjust fluid communication between the vessel inside space and the external environment.

II. BACKGROUND

Plants, statues, and other objects found in gardens, parks, or other outdoor areas are continuously exposed to changing environmental conditions. Exposure to environmental conditions, such as hail, heavy rain, or change in temperatures, can seriously damage and may kill plants. Similarly, exposure to such environmental conditions can cause physical damage to statues, garden ornaments, and the like. Sheet materials such as tarpaulins or plastic sheets may be utilized to shield objects from adverse environmental conditions. However, sheet materials can be susceptible to displacement by winds, and may only protect the top portion of the covered object from environmental conditions, leaving the sides of the object exposed to the environment.

III. SUMMARY OF THE INVENTION

Accordingly, a broad object of the invention can be to provide a thermally regulated enclosure system including one or more of: a vessel terminating in a top aperture element defining a top open area configured to engage a closure element opposite a bottom aperture element defining a bottom open area positionable on a support surface, the vessel having a vessel internal surface enclosing a vessel inside space communicating with the top open area and the bottom open area, a closure element which removably engages the top aperture element, and one or more stakes which can be detachably fastened to the bottom aperture element.

Another broad object of the invention can be a method of making a thermally regulated enclosure system including one or more of: configuring a vessel to terminate in a top aperture element, the top aperture element defining a top open area configured to engage a closure element opposite a bottom aperture element, the bottom aperture element defining a bottom open area positionable on a support surface, and the vessel having a vessel internal surface enclosing a vessel inside space communicating with the top open area and the bottom open area, removably engaging a closure element with the top aperture element, and detachably fastening one or more stakes to the bottom aperture element.

Another broad object of the invention can be a method of using a thermally regulated enclosure system including one or more of: obtaining an thermally regulated enclosure, including a vessel terminating in a top aperture element defining a top open area configured to receive a closure element opposite a bottom aperture element defining a bottom open area positionable on a support surface, the vessel having a vessel internal surface enclosing a vessel inside space communicating with the top open area and the bottom open area, a closure element which removably couples to the top aperture element, and one or more stakes detachably fastened to the bottom aperture element; positioning a protected object under the vessel with the bottom aperture element of the vessel positioned proximate the support surface, applying pressure to the vessel to penetrate the support surface with the one or more stakes, and coupling the closure element to the top aperture element.

Another broad object of the invention can be to provide a kit to retrofit a container including one or more of: one or more stakes each having a stake first end and stake second end, the stake first end including a first bifurcate member and a second bifurcate member, wherein one of the first or second bifurcate members contains one or more piercing elements, the piercing elements including a fixation end, piercing end, and a piercing element shaft, the piercing end and fixation end of the piercing elements having a diameter larger than a diameter of the piercing element shaft, and an elongate member.

Another broad object of the invention can be a method of making a thermally regulated enclosure utilizing a kit to retrofit a container including one or more of: obtaining a vessel having a top aperture element defining a top open area configured to receive a closure element; detaching the bottom portion of the vessel to provide a bottom aperture element defining a bottom open area; obtaining a retrofit kit, including one or more of: one or more stakes, wherein the stakes each have a stake first end and stake second end, the stake first end having a first bifurcate member and second bifurcate member, wherein one of the first or second bifurcated members contains one or more piercing elements, the piercing elements including a fixation end, piercing end, and a piercing element shaft, the piercing end and fixation end of the piercing elements can have a diameter larger than a diameter of the piercing element shaft, and an elongate member; fastening one or more stakes to the peripheral margin of the bottom aperture element of the vessel; and passing the elongate member having a member first end and second end, through the vessel proximate the top aperture element and transversing the vessel, wherein the member first end and the member second end extending a distance outward of the vessel, the member second end insertable into the support surface.

IV. A BRIEF DESCRIPTION OF THE DRAWINGS

FIG. 8 is a depiction of a particular embodiment of a kit for retrofitting a container to make an embodiment of the thermally regulated enclosure system.

V. DETAILED DESCRIPTION OF THE PREFERRED EMBODIMENTS

Referring generally to FIGS. 1 through 4, 5A through 5E, 6A through 6E, and 7A through 7C, particular embodiments of the thermally regulated enclosure system (1) can include one or more of: a vessel (2), a closure element (3), and one or more stakes (4).

Figure 5A:
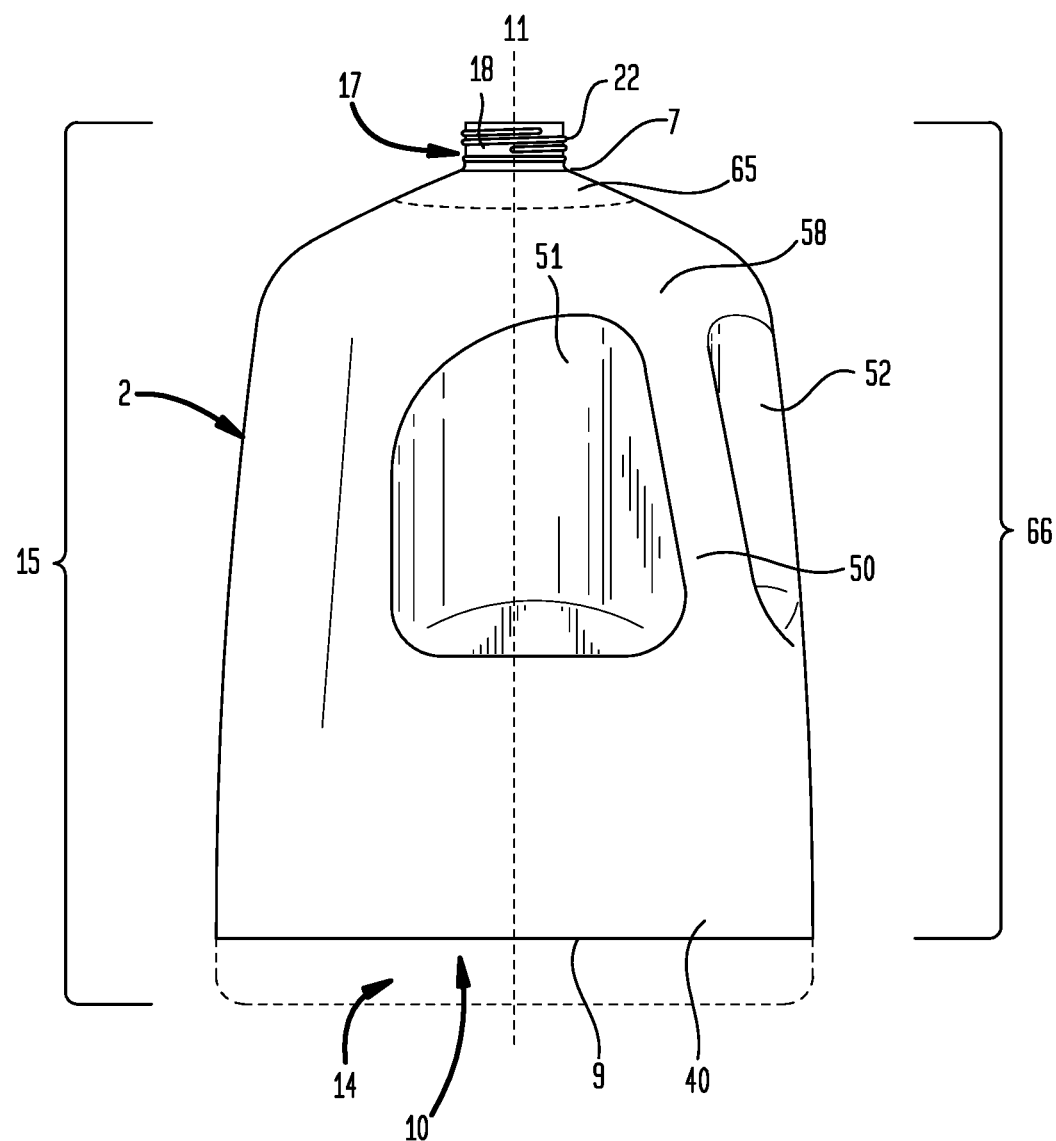
FIG. 5A is a first elevation view of a particular embodiment of the vessel depicted in FIG. 1.
Figure 5B:
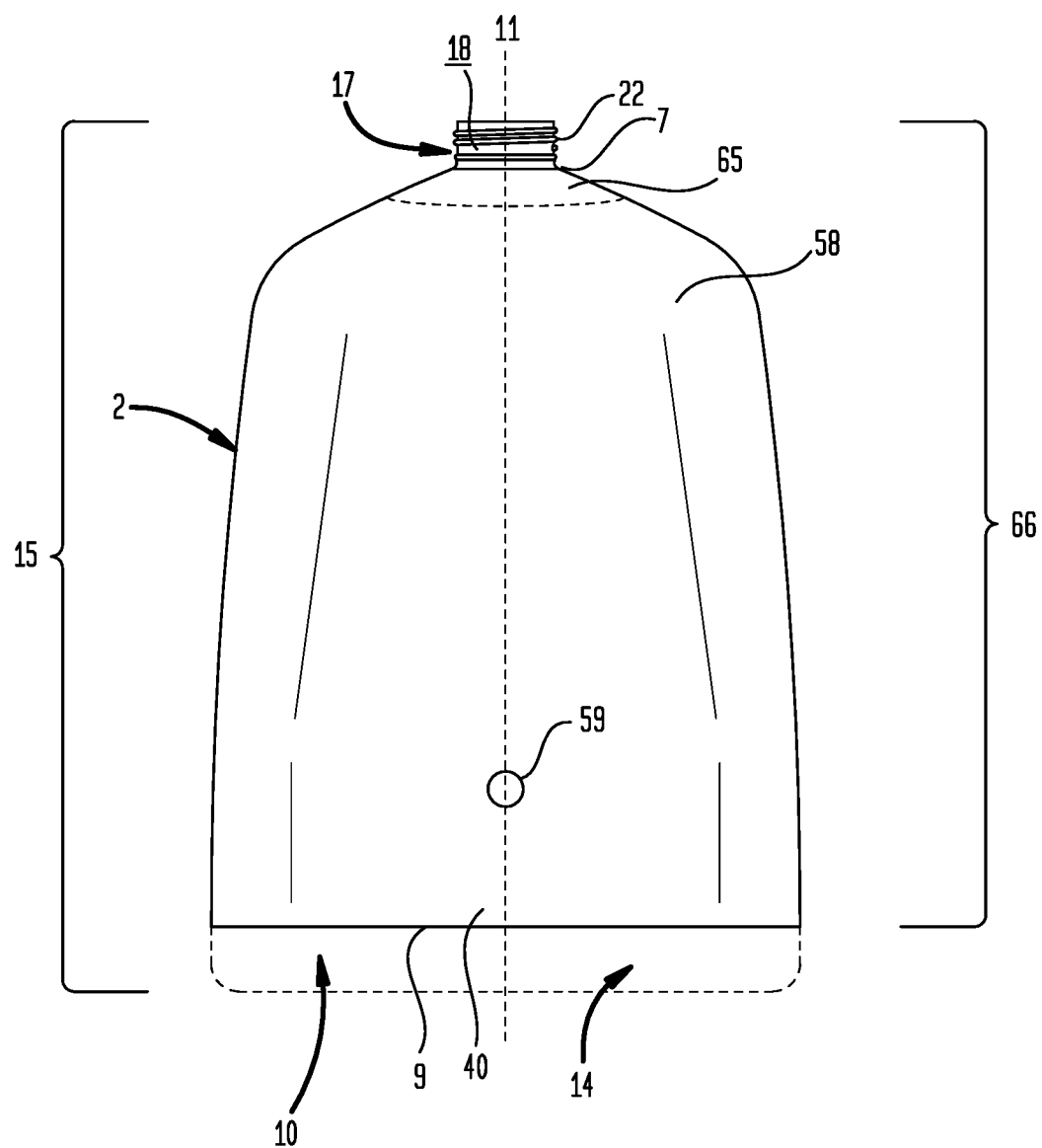
FIG. 5B is a second elevation view of a particular embodiment of the vessel depicted in FIG. 1.
Figure 5C:
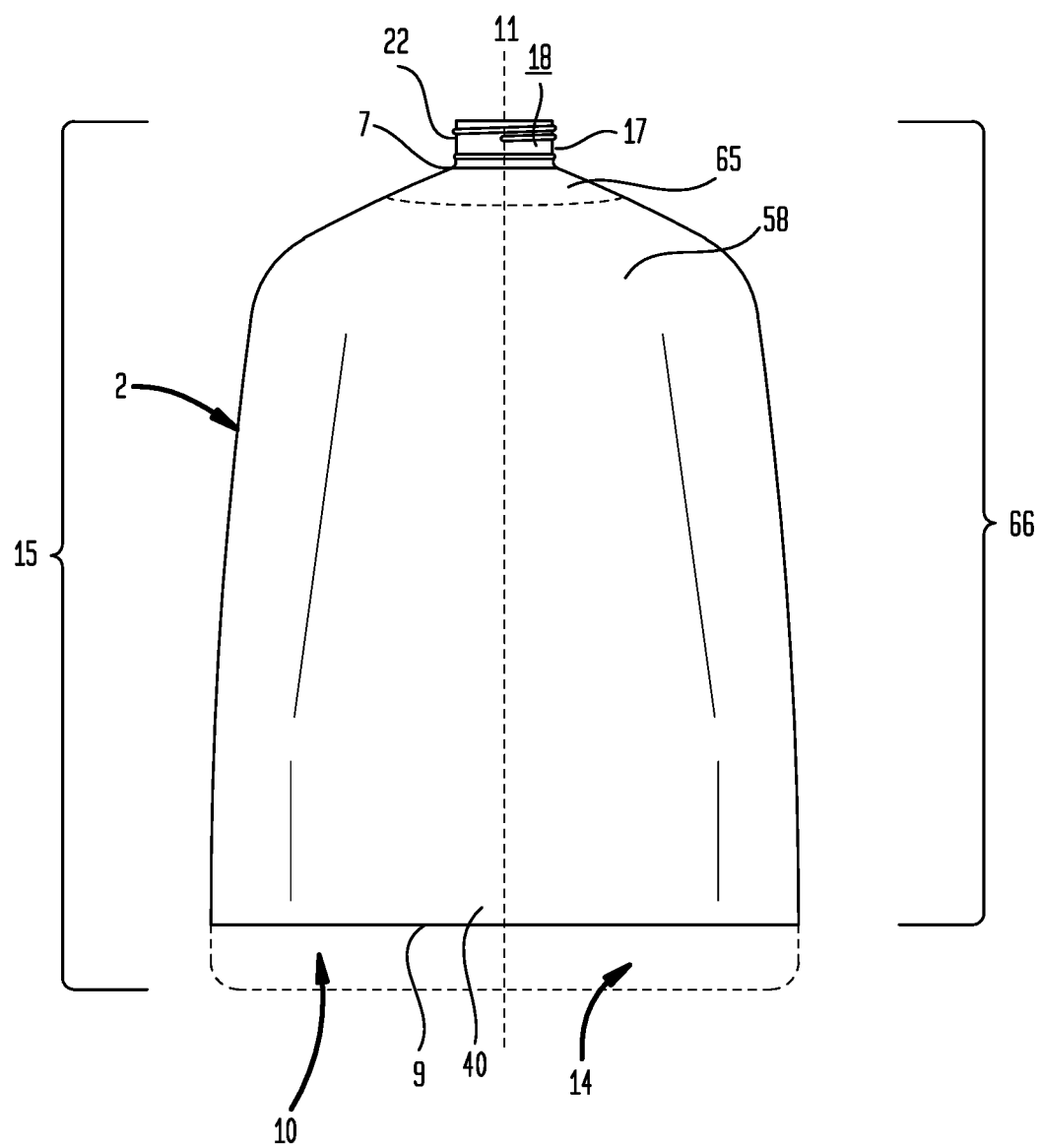
FIG. 5C is a third elevation view of a particular embodiment of the vessel depicted in FIG. 1.
Figure 5D:
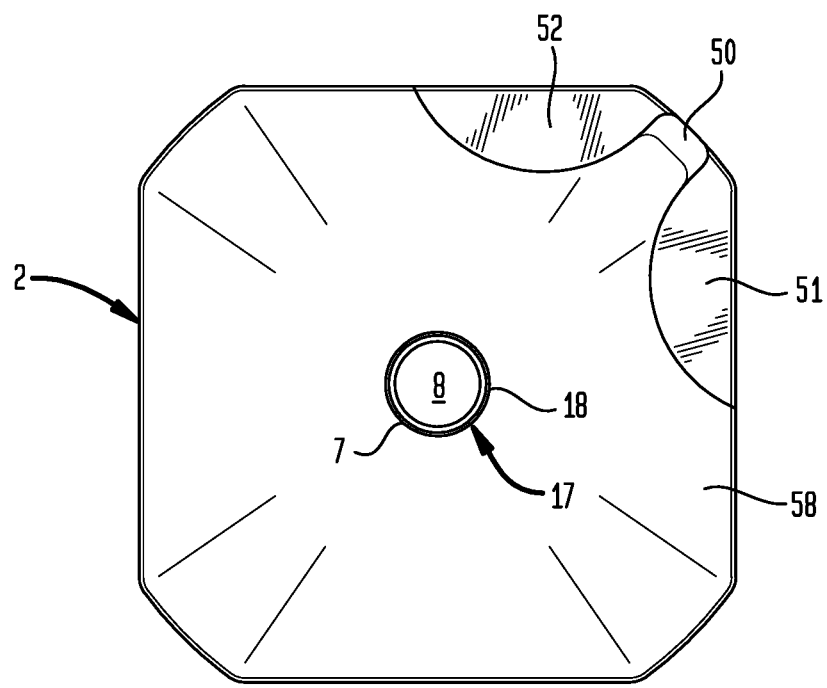
FIG. 5D is a top plan view of a particular embodiment of the vessel depicted in FIG. 1.
Figure 6A:
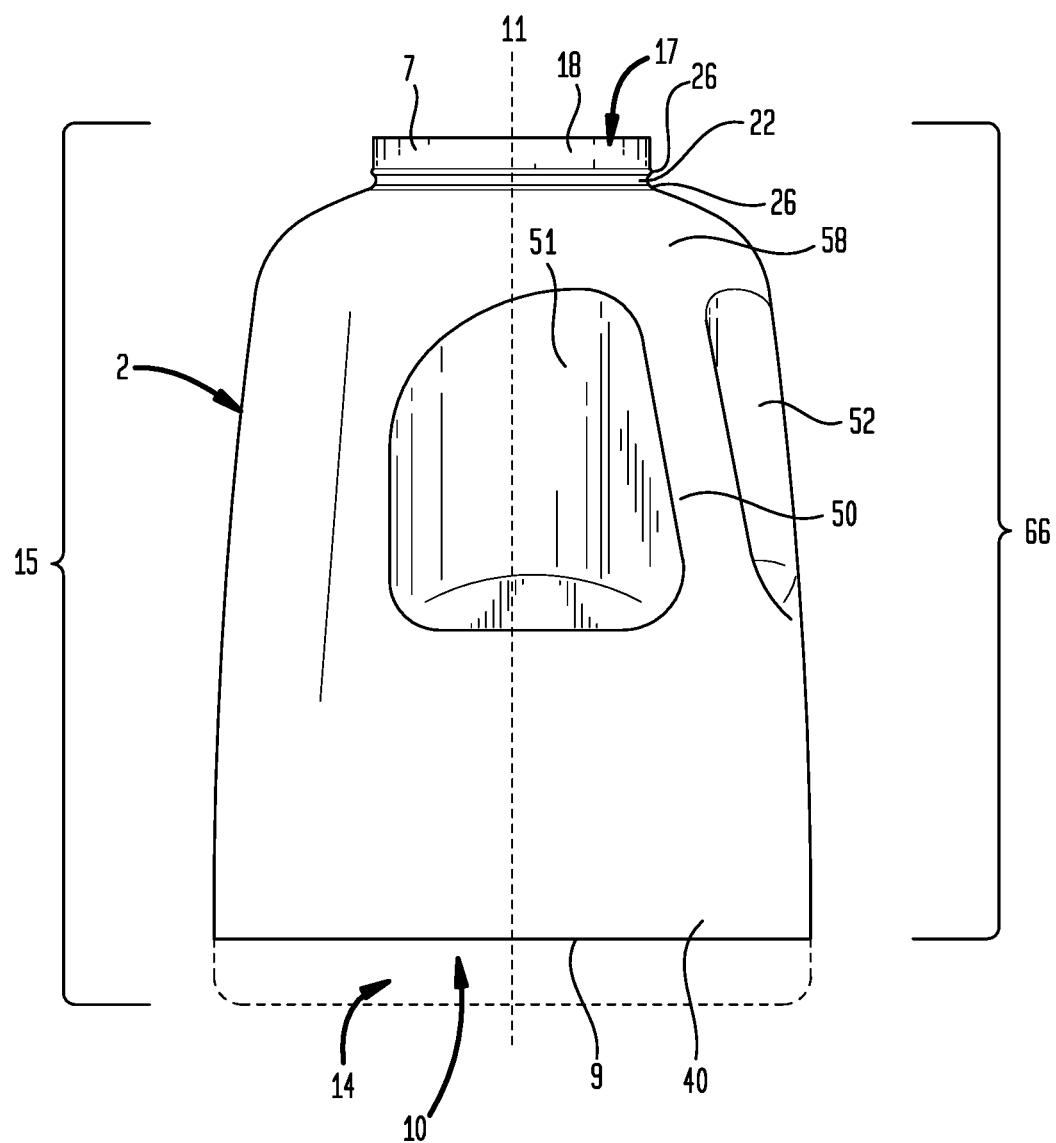
FIG. 6A is a first elevation view of a particular embodiment of the vessel depicted in FIG. 2.
Figure 6B:
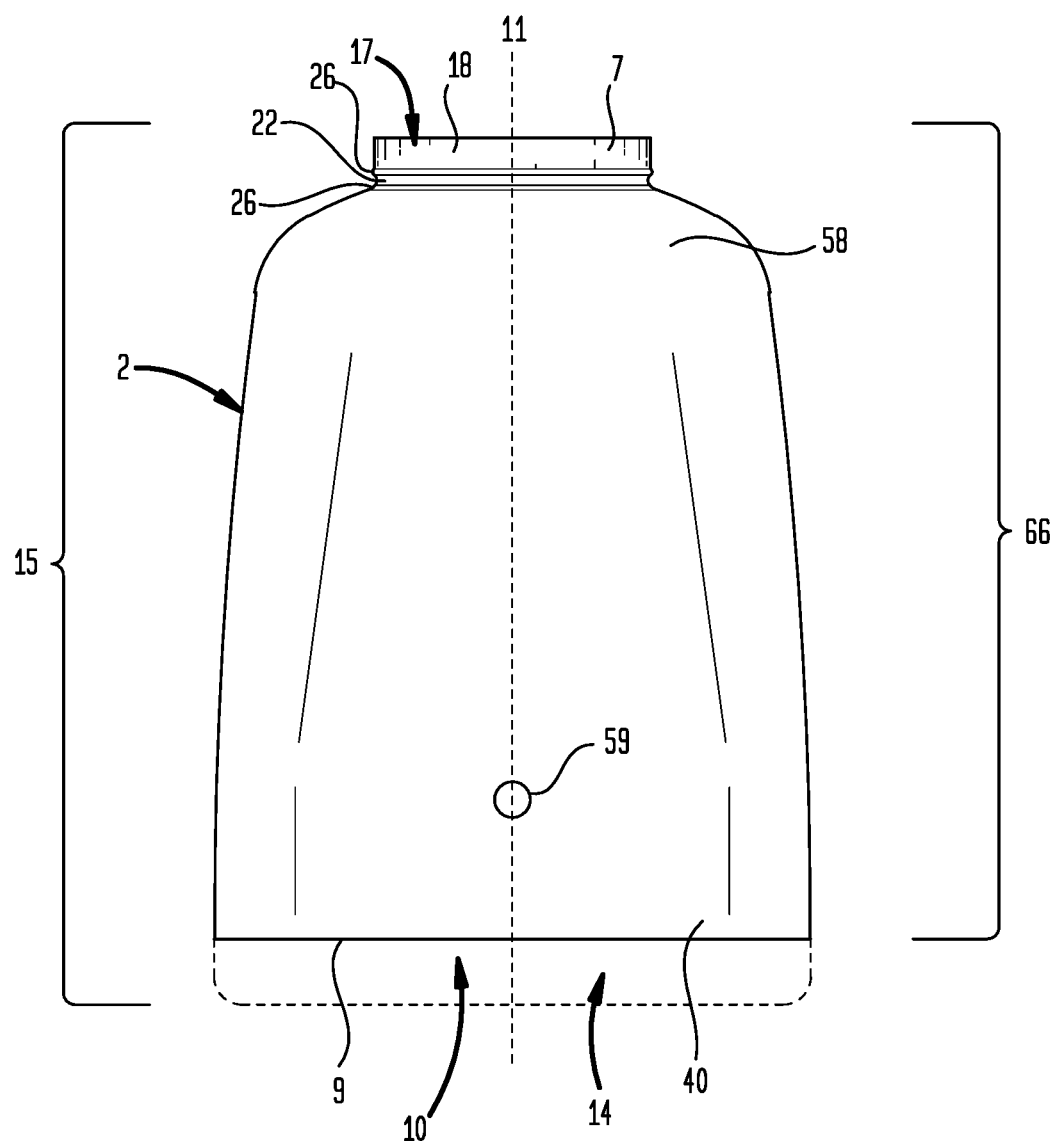
FIG. 6B is a second elevation view of a particular embodiment of the vessel depicted in FIG. 2.
Figure 6C:
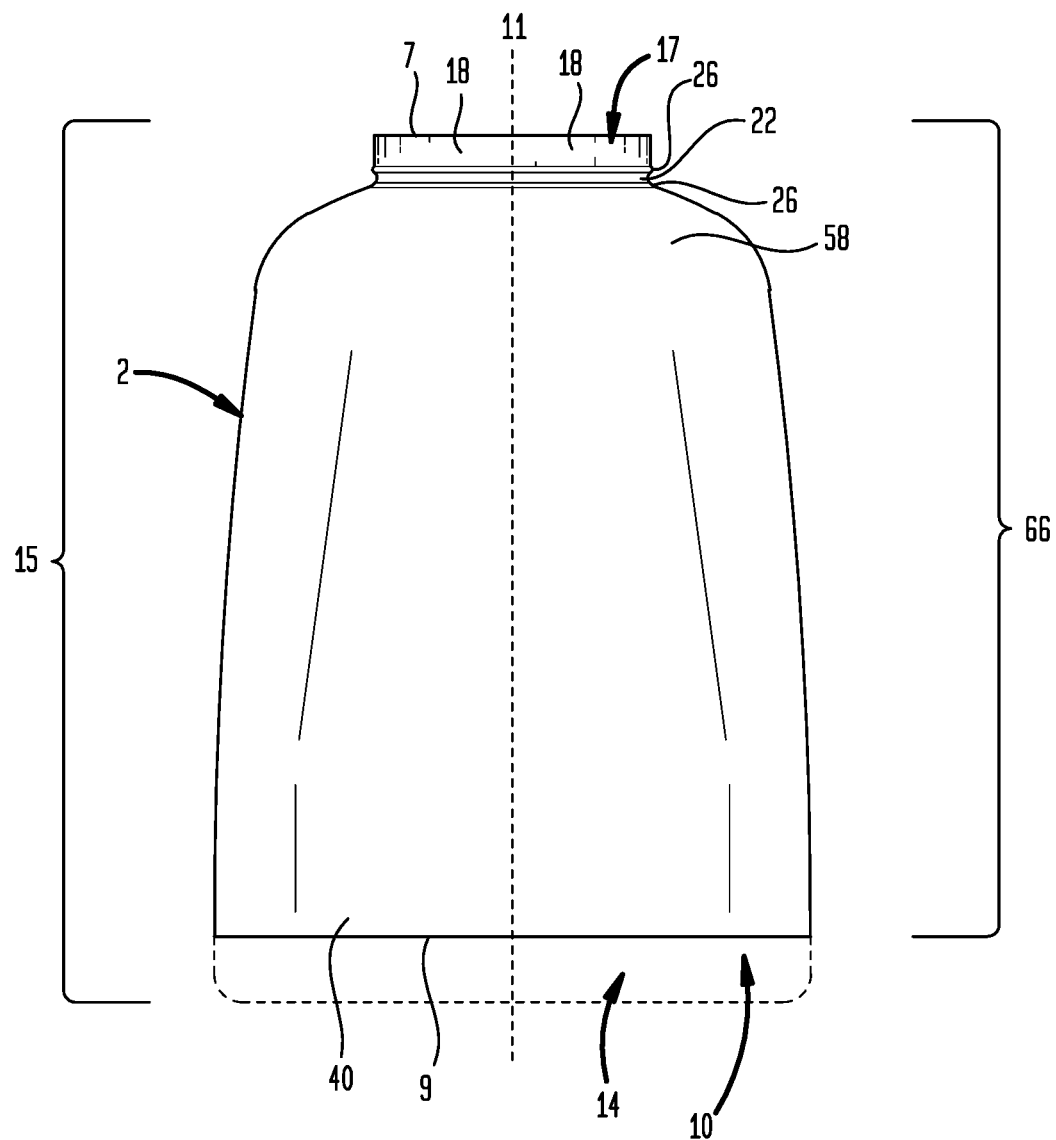
FIG. 6C is a third elevation view of a particular embodiment of the vessel depicted in FIG. 2.
Figure 6D:
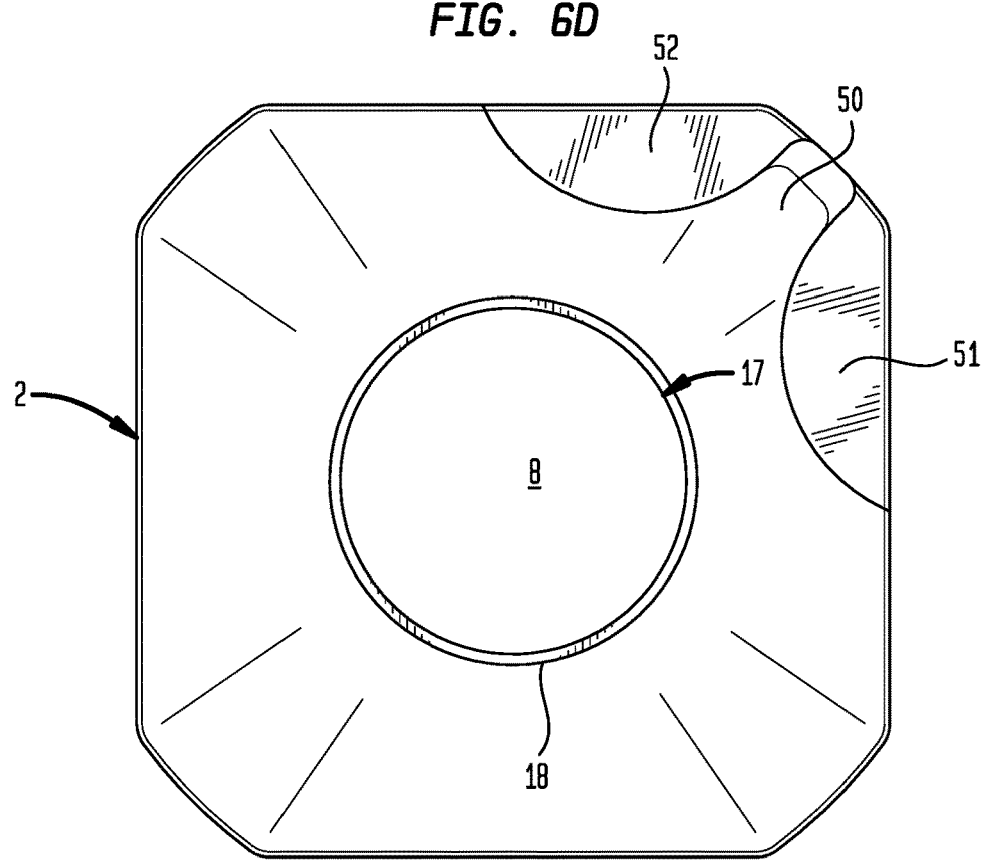
FIG. 6D is a top plan view of a particular embodiment of the vessel depicted in FIG. 2.

The vessel (2) can have a vessel internal surface (5) defining a vessel inside space (6) which communicates between a top aperture element (7), which defines a top open area (8) and a bottom aperture element (9), which defines a bottom open area (10). Typically, the top aperture element (7) defines a top open area (8) lesser in area than the bottom open area (10); however, this is not intended to obviate embodiments which have a top open area (8) greater than or substantially equal to the bottom open area (10). Further, the top aperture element (7), while shown as substantially circular in FIGS. 5D and 6D, is not intended to obviate embodiments which include other top aperture element (7) configurations such as triangular, square, rectangular, oval, or the like, or combinations thereof. As to particular embodiments, the top aperture element (7) can include a plurality of top aperture elements (7), whether discrete or interconnected, which correspondingly alters the top open area (8) of the vessel (2). The top aperture element (7), while shown in the FIGS. 5A through 5C and 6A through 6C as being disposed opposite the bottom aperture element (9)(as shown in FIG. 5A), is not intended to obviate embodiments in which the top aperture element (7) has a location offset from the central longitudinal axis (11) of the vessel (2).

Again referring primarily to FIGS. 1, 2, 4, and 5A the bottom aperture element (9) can have a configuration positionable on a support surface (12). The bottom aperture element (9) can be disposed in orthogonal relation to the central longitudinal axis (11) of the vessel (2) such that the bottom aperture element (9) positioned on a support surface disposes the vessel (2) in generally vertical relation to the support surface (12); however, the bottom aperture element (9) can be disposed in an angled relation to the central longitudinal axis (11) of the vessel (2) to correspondingly dispose the vessel (2) in angled relation to the support surface (12). The bottom aperture element (9) can be configured to define a greater or lesser bottom open area (10) depending on the support surface area (13) to be enclosed by the vessel (2). In particular embodiments, the bottom aperture element (9) can be configured to define a bottom open area (10) including the greatest cross-sectional area through the central longitudinal axis (11) of the vessel (2).

As to particular embodiments, the vessel (2) can be made from one or more materials including or consisting of: paper, plastic, glass, or other transparent, translucent, or opaque material, or combinations thereof. As to particular embodiments, the vessel (2) can, but need not necessarily, be made from a used container, such as a milk container, soda bottles, bleach bottle, or the like, by removal of the bottom portion (14) of the container (15) or bottle. See as illustrative examples, FIGS. 5A through 5C and 6A through 6D which show the bottom portion (14) in broken line.

Now referring primarily to FIGS. 1-4, the thermally regulated enclosure system (1) can further include a closure element (3) removably engagable to the top aperture element (7). As to particular embodiments, the closure element (3) can be positioned over the top aperture element (7) to alter the top open area (8) to increase or decrease fluid communication between the vessel inside space (6) and the environment (16) external to the vessel (2). In this regard, the closure element (3) can have any one of numerous configurations to allow positioning over the top aperture element (7) of the vessel (2).

Particular embodiments of the thermally regulated enclosure system (1) can, but need not necessarily, include a neck element (17) outwardly extending from the top aperture element (7). Depending upon the embodiment, the vessel (2) and neck element (17) can be one piece, or the neck element (17) can be discrete from and coupled to the vessel (2). The neck element (17) can have a neck external surface (18) and the closure element can have a closure internal surface (19) each configured to removably, matingly engage or incrementally removably, matingly engage between an open condition (20) and a closed condition (21)(as shown in the example of FIG. 3) to correspondingly adjust the top open area (8) or to increase or reduce fluid communication between the vessel inside space (6) and the environment (16) external to the vessel (2). As shown in the examples of FIGS. 1 and 2, the neck element (17) can be configured to define a lesser or greater top open area (8) depending on the application.

Now referring primarily to FIGS. 1 and 5A through 5D, as to particular embodiments, a first spiral thread (22) can be affixed to the neck external surface (18) of the neck element (17) and a second spiral thread (23) can be affixed to the closure internal surface (19) of the closure element (3). The first and second spiral thread (22)(23) can be removably, rotatingly, mateably engaged between an open condition (20) and a closed condition (21) to allow adjustment of the level of fluid communication between the vessel inside space (6) and the environment (16) external to the vessel (2). The neck element (17) and the closure element (3) can be removably, matingly engaged in numerous configurations such as compression or friction fit of the closure external surface (24) as a plug or of the closure internal surface (19) as a cap.

Figure 1:
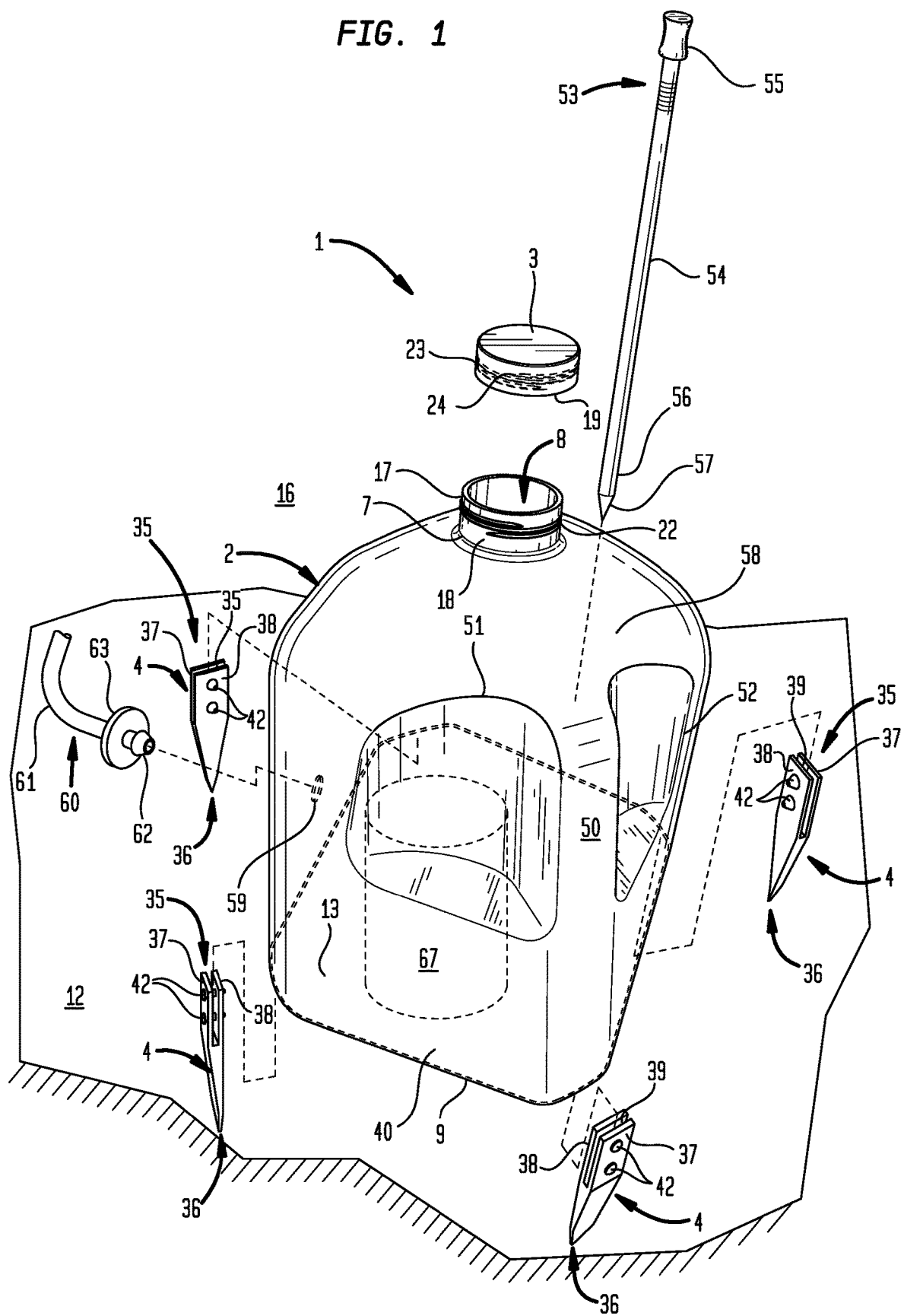
FIG. 1 is an exploded view of a first particular embodiment of a thermally regulated enclosure system.
Figure 2:
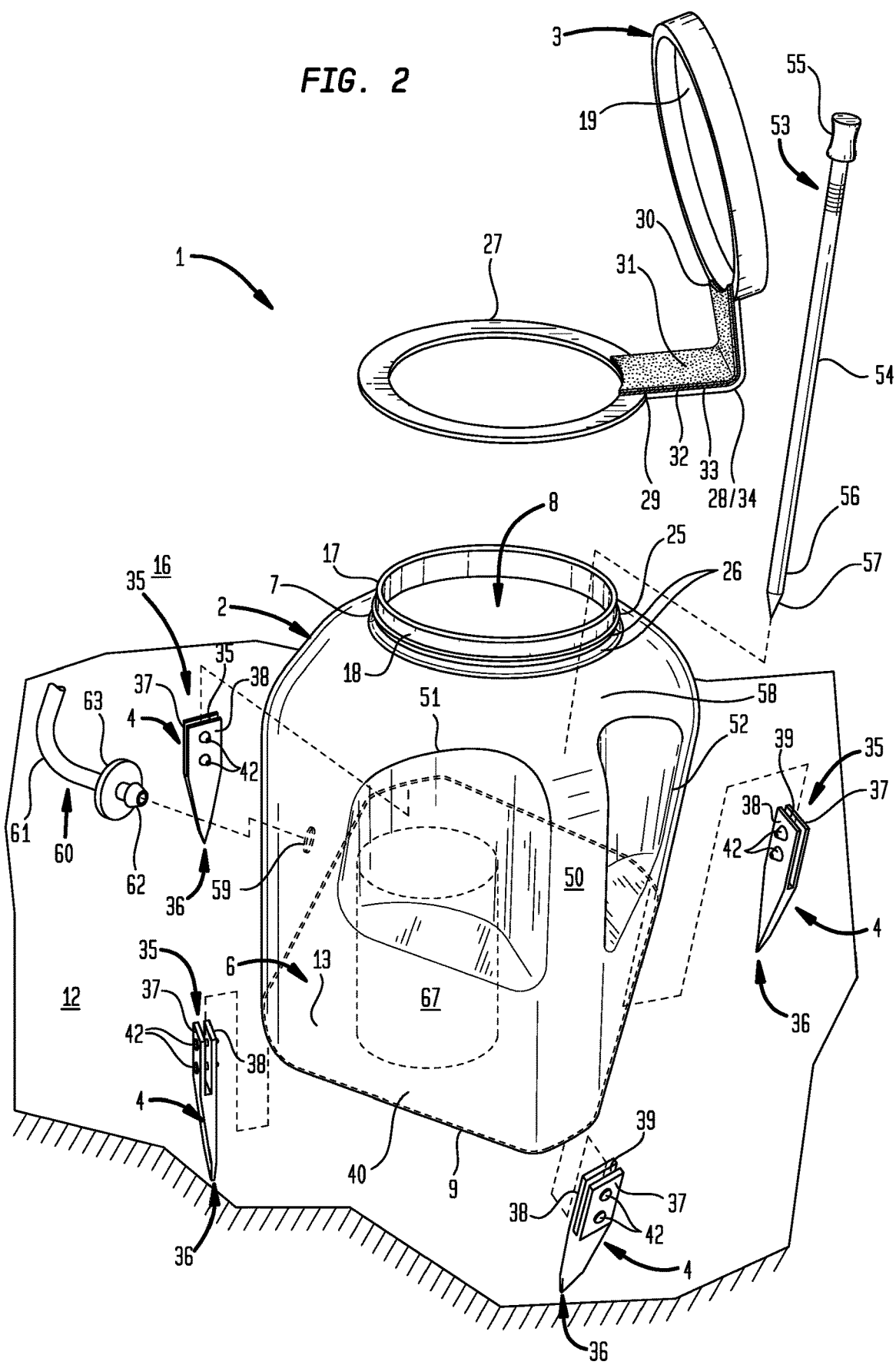
FIG. 2 is an exploded view of a second particular embodiment of a thermally regulated enclosure system.
Figure 3:
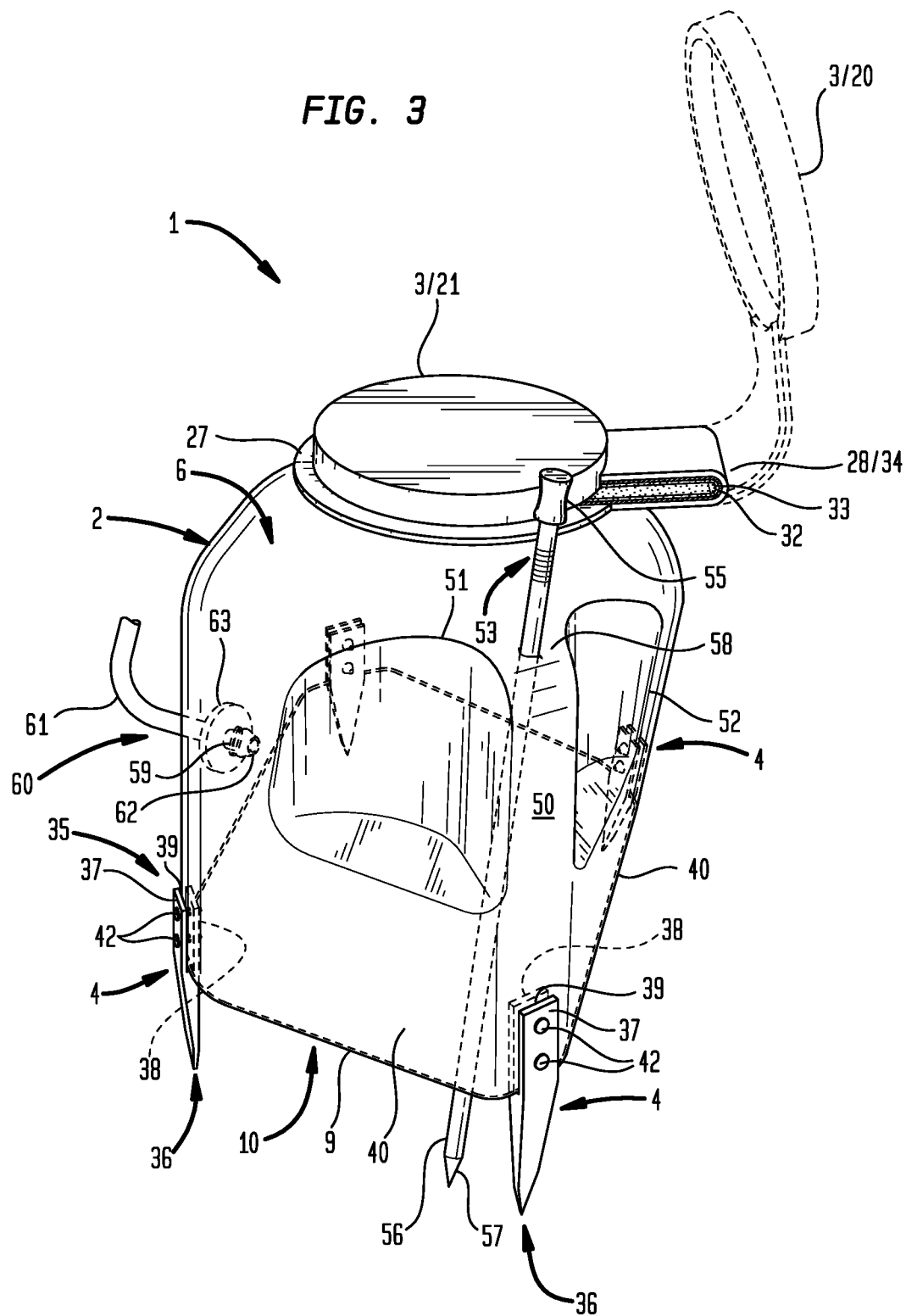
FIG. 3 is a perspective view of a particular embodiment of a thermally regulated enclosure system depicted in FIG. 2.

As shown in the example of FIGS. 1 and 2, the top open area (8) can, but need not necessarily, define a lesser open area as compared to the cross-sectional area of the vessel (2) orthogonal to the central longitudinal axis of the vessel. However, it should be understood that the neck element (17) can have a greater or lesser aperture open area depending upon the embodiment.

Again referring to FIGS. 2, 3, and 4, the neck element (17) can, but need not necessarily, include a groove (25) circumferentially affixed to the neck element (17). In particular embodiments, the groove (25) can be formed, cut, or etched about the circumference of the neck element (17), or configured by circumferentially affixing in substantially parallel relation a pair of raised threads (26) about the neck element (17). The closure element (3) can be coupled to an annular ring (27) which can be disposed in the groove (25) to secure the closure element (3) to the vessel (2).

Again referring to FIGS. 2 through 4, a tether element (28) can, but need not necessarily, be interposed between the closure element (3) and the annular ring (27). As to particular embodiments, a tether first end (29) can be coupled to the annular ring (27), and the tether second end (30) can be coupled to the closure element (3).

Figure 4:
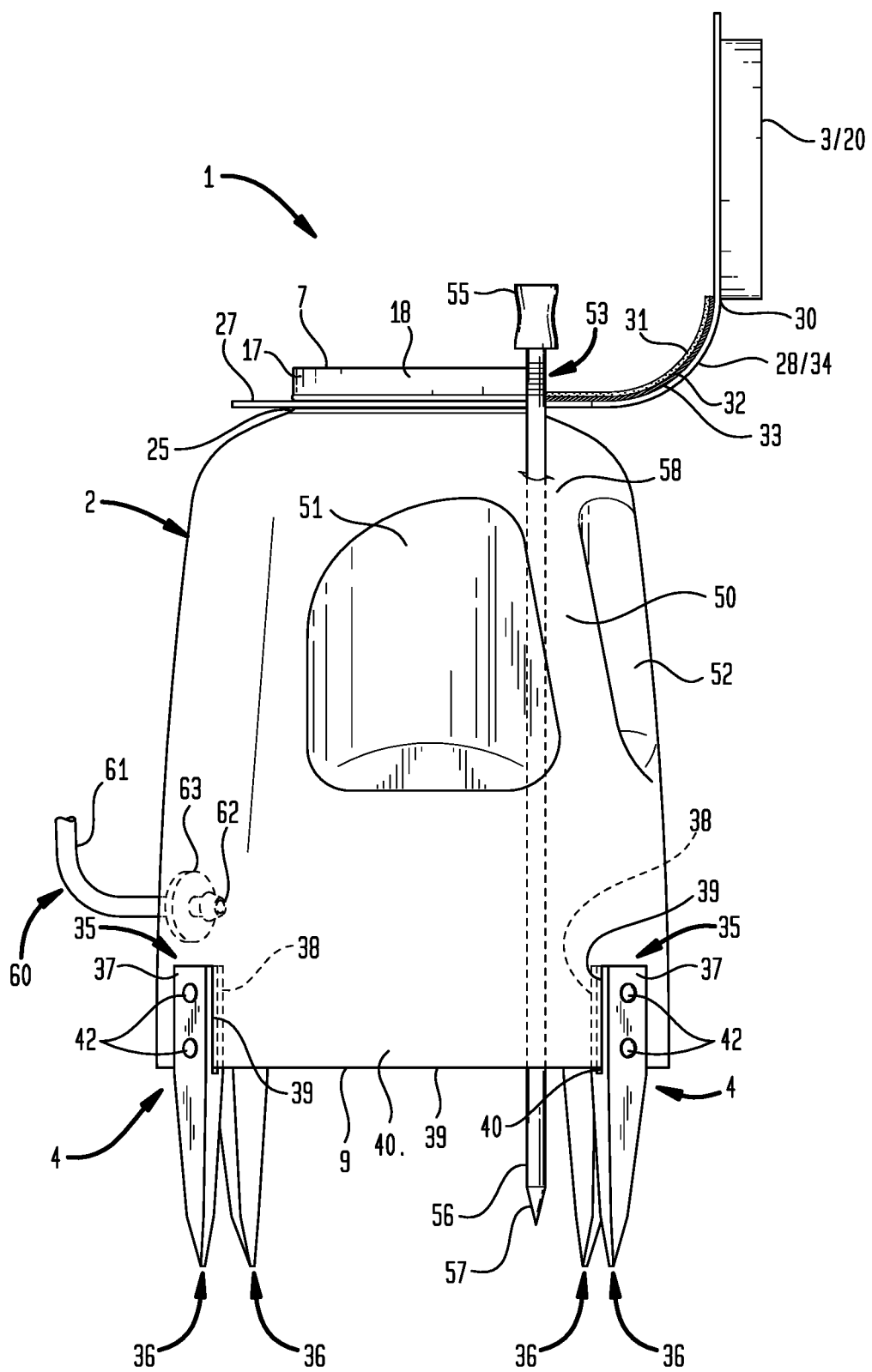
FIG. 4 is a first elevation view of a particular embodiment of a thermally regulated enclosure system depicted in FIG. 2.

Again referring primarily to FIGS. 2 through 4, embodiments can, but need not necessarily, include a closure movement element (31) coupled to the tether element (28), whether along the entire length between the tether first end (29) and the tether second end (30) or at evenly or unevenly-spaced intervals along the length of the tether element (28), or other variation which operates to move the closure element (3) in relation to the top aperture element (7) between an open condition (20) and a closed condition (21). Particular embodiments of the closure movement element (31) can include a first layer (32) disposed in fixed relation to a second layer (33) (or plurality of layers). The first and second layers (32)(33) (or the plurality of layers) can have disparate coefficients of thermal expansion. The coefficients of thermal expansion can be selected from a range of coefficients of thermal expansion which cause disparate contraction and expansion in relation to a corresponding range of ambient temperatures of the environment (16) surrounding the vessel (2) including about 25 degrees Fahrenheit (° F.) to about 115° F. The ambient temperatures can be selected from the group including or consisting of: about 25° F. to about 45° F., about 35° F. to about 55° F., about 45° F. to about 65° F., about 55° F. to about 75° F., about 65° F. to about 85° F., about 75° F. to about 95° F., about 85° F. to about 105° F., and about 95° F. to about 115° F.

As one illustrative example, a first layer of steel and a second layer of brass can have sufficiently disparate coefficients of thermal expansion which can expand and contract in one or more of these temperature ranges. Depending on the geographical location, the specific materials utilized in the first layer or the second layer (32)(33)(or a plurality of layers) can vary according to the regional ranges of temperatures. Upon change in the ambient temperature, the first layer (32), second layer (33) (or plurality of layers), or both can contract or expand in relation to the respective coefficients of thermal expansion at different rates causing the tether element (28) to bend, flex, or alter configuration to correspondingly move the closure element (3) in relation to the top aperture element (7) between an open condition (20) and a closed condition (21) to adjust the top open area or the level of fluidic communication between the vessel inside space (6) and the environment (16) external to the vessel (2). As to particular embodiments, the closure movement element (31) associated with the tether element (28) can be configured as an arcuate elongate strap (34) as shown in the example of FIG. 4; however, this is not meant to obviate other configurations of the tether element (28) associated with the closure movement element (31) in which the tether first end (29) moves in relation to the tether second end (30), thereby moving the closure element (3) in lesser or greater proximity to the top aperture open element (7) such as a concentric spiral or undulated surface.

Now referring primarily to FIGS. 1 through 4 and 7A through 7C, the thermally regulated enclosure system (1) can, but need not necessarily, include one or more stakes (4). For brevity, only one stake (4) will be described herein, but it should be understood that one or more than one stake (4) can include one or more of the elements described herein. Each stake (4) can include a stake first end (35) opposite a stake second end (36). The stake first end (35) can be configured to secure to the bottom aperture element (9) of the vessel (2) and the stake second end (36) can be configured to be forcibly urged into a support surface (12) disposed beneath the vessel (2).

As to particular embodiments, the stake first end (35) can, but need not necessarily include, a first bifurcate member (37) located opposite a second bifurcate member (38) having a longitudinal space (39) between the first and second bifurcate members (37)(38). The longitudinal space (39) can be configured to receive between the first and second bifurcate member (37)(38) the peripheral margin (40) of the vessel (2) proximate the bottom aperture element (9).

Figure 7A:
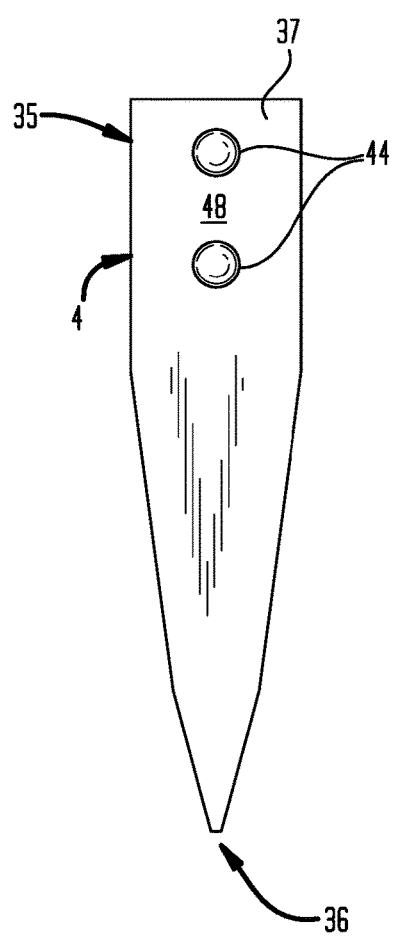
FIG. 7A is a front elevation view of a particular embodiment of a stake element.
Figure 7B:
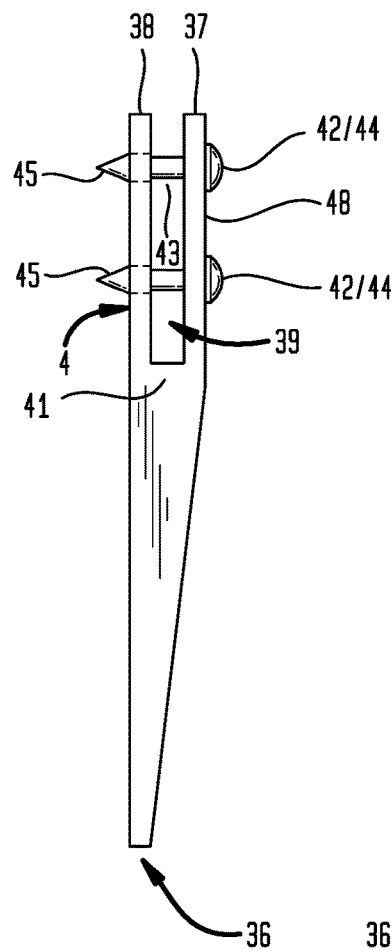
FIG. 7B is a side elevation view of a particular embodiment of the stake element illustrating a first bifurcate member opposite a second bifurcate member in a closed condition.
Figure 7C:
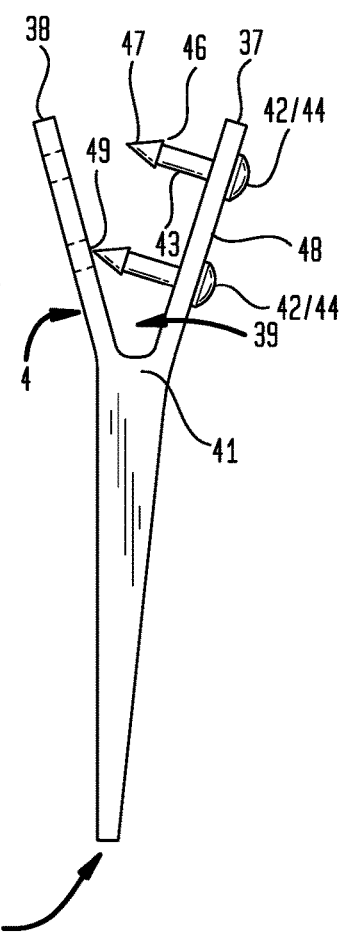
FIG. 7C is a side elevation view of a particular embodiment of the stake element illustrating the first bifurcate member opposite the second bifurcate member in an open condition.

As to particular embodiments, the stake first end (35) can, but need not necessarily, include a flexure element (41)(as shown in the example of FIGS. 7A through 7C) coupled or integral to the first or the second bifurcate member (37)(38), which can flex to increase or decrease the width of the longitudinal space (39). The flexure element can, as to certain embodiments, be integral to the first or second bifurcate member (37)(38) allowing the first or second bifurcate member (37)(38) to medially flex, while as to other embodiments, the first and second bifurcate members (37) (38) can be joined by the flexure element (41) which flexes independent of any flexure of the medial portion of the first or second bifurcate member (37)(38).

As to particular embodiments, piercing elements (42) can, but need not necessarily, be used to secure the stake first end (35) to the peripheral margin (40) of the vessel (2) proximate the bottom aperture element (9). The piercing elements (42) can be configured to have a shaft (43) located between a fixation end (44) and a piercing end (45), so that the entire length of a piercing element (42) can traverse the combined width of the first bifurcate member (37), the longitudinal space (39), and second bifurcate member (38). The peripheral margin (40) of the vessel (2) received within the longitudinal space (39) can be traversed by the piercing element (42) to secure the stake first end (35) to the peripheral margin (40) of the vessel (2) proximate the bottom aperture element (9). The piercing end (45) of particular embodiments can taper from a piercing end base (46) to a piercing end point (47). As to other embodiments of the piercing element (42), the piercing end (45) and the fixation end (44) can be dimensionally greater than the shaft (43). In particular embodiments, the fixation end (44) can be fixedly connected to the first bifurcate member (37), the piercing end (45) oriented toward the second bifurcate member (38). The fixation end (44) can be integrally fixedly connected to the first bifurcate member (37) as a one piece construct or can be fixedly connected by traversing the first bifurcate member (37) to engage the fixation end (44) against the first bifurcate member external surface (48) preventing the fixation end (44) from traveling through the first bifurcate member (37). The piercing elements (42) can be constructed of metal, such as stainless steel, plastic, or other like material or combinations thereof.

As to particular embodiments, a portion of the peripheral margin (40) of the vessel (2) proximate the bottom aperture element (9) can be received inside of the longitudinal space (39) defined by the first and second bifurcate members (37)(38). The piercing end (45) of the piercing element (42) can, upon forcible urging, traverse one or more of the first bifurcate member (37), the peripheral margin (40) of the vessel (2) proximate the bottom aperture element (9), and the second bifurcate member (38) to secure the peripheral margin (40) of the vessel (2) inside the longitudinal space (39) and correspondingly secure the stake (4) to the vessel (2). As to particular embodiments, the second bifurcate member (38) can include a hole (49) positionally aligned opposite the piercing end (45) to enable the piercing end (45), upon forcible urging, to pass through the hole (49). In another embodiment, the second bifurcate member (38) can be a solid piercable by the piercing end (45), thereby creating a passage through the second bifurcate member (38).

In particular embodiments, either the piercing end (45) or the hole (49) can resiliently deform to allow passage of the piercing end upon forcible urging, but prevent passage in the absence of forcible urging. In yet another embodiment, the piercing end (45) can be detachable from the shaft (43). The piercing end (45) can be dimensionally configured to prevent the passage of the piercing end (45) through the second bifurcate member (38). The piercing end (45) can be detached to permit the passage of the shaft (43) through the first bifurcate member (37), the peripheral margin (40) of the vessel (2) proximate the bottom aperture element (9), and second bifurcate member (38) to release the peripheral margin (40) of the vessel (2) from the stake (4). The piercing end (45) can be reattached to the shaft (43) to allow repeated use of the stake (4).

Again referring to FIGS. 7A through 7C, the stake (4) can taper along the stake length toward the stake second end (36) to provide a stake second end (36) which can, but need not necessarily be pointed or tapered to a truncated point.

Now referring primarily to FIGS. 1, 2, 5A, and 6A, particular embodiments of the thermally regulated enclosure system (1) can further include a grippable vessel handle (50). As to particular embodiments, a first recess element (51) and a second recess element (52) can be disposed in the vessel (2) a distance apart to provide in the interposed portion of the vessel (2) a grippable vessel handle (50). The first and second recess elements (51)(52) can, but need not necessarily, be disposed in symmetrical spaced apart relation allowing a plurality of vessels (2) to be stacked in a nesting relation.

Now referring primarily to FIGS. 1 through 4, particular embodiments of the thermally regulated enclosure system (1) can, but need not necessarily, include an elongate member (53) of sufficient length to traverse the vessel inside space (6) and insert a depth into the support surface (12) to fixedly secure the vessel (2) in relation to the support surface (12). The elongate member (53) can have a member medial portion (54) disposed between a member first end (55) and a member second end (56). The configuration of the elongate member (53) can, but need not necessarily, be circular in cross section orthogonal to the member longitudinal axis; cross sectional configurations can as examples be: square, rectangular, oval or the like or combinations thereof. In a particular embodiment, the elongate member (53) can be passed through the vessel (2) at a location proximate the top aperture element (7), and traverse the vessel inside space (6) between the first and second recess elements (51)(52) of the grippable vessel handle (50); although the elongate member (53) can penetrate the vessel (2) at any location that allows the elongate member (53) to pass through the vessel inside space (6) and extend outward of the bottom aperture area (10). The member second end (56) can, but need not necessarily, taper toward a point (57). The member first end (55) can be dimensionally greater than the elongate member medial portion (54), so that the member first end (55) fixedly engages the vessel external surface (58). The elongate member (53) can be constructed of any one or a combination of wood, metal, plastic, glass, or other rigid material.

Now referring primarily to FIGS. 1 through 4, a particular embodiment of the thermally regulated enclosure system (1) can further include an inlet element (59) disposed in the vessel (2). The inlet element (59) can be configured to receive or allow an irrigation element (60) to pass into the vessel inside space (6). The irrigation element (60) can be any one of a varied and numerous devices which allow an amount of fluid to pass into the vessel inside space (6). The irrigation device, as one example, can be a tubular member (61) which passes through the inlet element (59) and into the vessel inside space (6), through which an amount of fluid passes into the vessel inside space (6). The tubular member (61) can be constructed of an elastomeric material, glass, plastic, metal, or the like or combinations thereof. The tubular member (61) can, but need not necessarily, have an enlarged terminal end (62) that can resiliently deform to allow passage through the inlet element (59) upon forcible urging, but prevents passage through the inlet element (59) in the absence of forcible urging. The irrigation element (60) can include a fluid flow restrictor (63) which can be removably affixed to the inlet element (59). The fluid flow restrictor (63) can, but need not necessarily, be in the form of a drip emitter which limits the flow of liquid such as water to about 0.5 liters per hour to about 8 liters per hour, an illustrative example of which is a Raindrip Compensating Dripper, SKU PC80550B.

Now referring primarily to FIGS. 5A through 5C, 6A through 6D, and 8, particular embodiments can provide a kit (64) to retrofit a container lacking a bottom aperture element (9) or a top aperture element (7) for use as a vessel (2). The container (15) can, but need not necessarily, terminate in a top aperture element (7) which defines a top open area (8), and may further include a neck element (17) configured to engage a closure element (3), as above described. Such containers (15) can include, without limitation, milk containers, water containers, soda containers, liquid bleach containers, detergent containers, or the like, or combinations thereof. The kit (64) can include one or more stakes (4) as above described. The kit (64) can further include a closure element (3), and a tether element (28) (whether or not including a closure movement element (31) or an annular ring (27)). The retrofit kit (64) can further include one or more of an irrigation element (60), a fluid flow restrictor (63), and an elongate member (53), as above described.

Figure 5E:
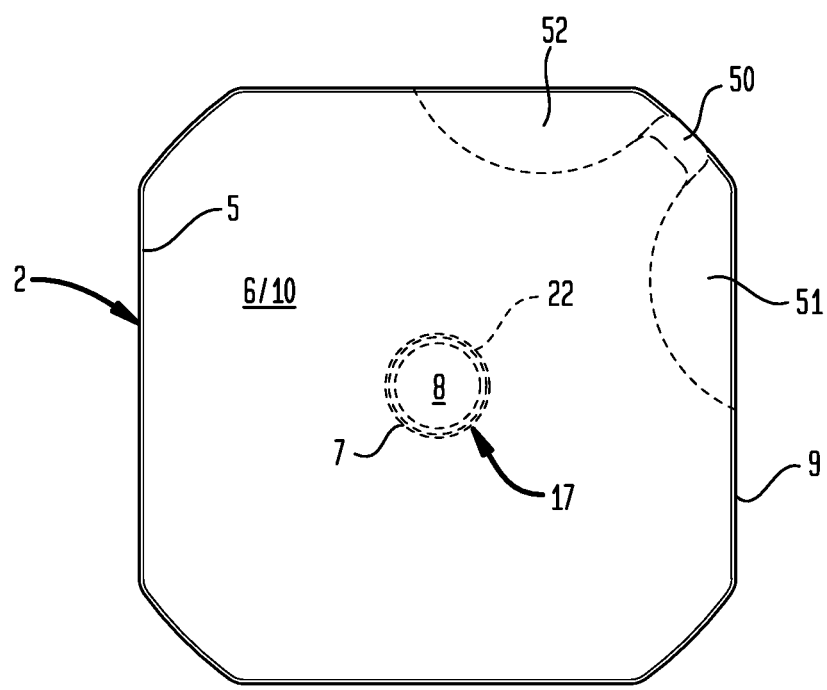
FIG. 5E is a bottom plan view of a particular embodiment of the vessel depicted in FIG. 1.
Figure 6E:
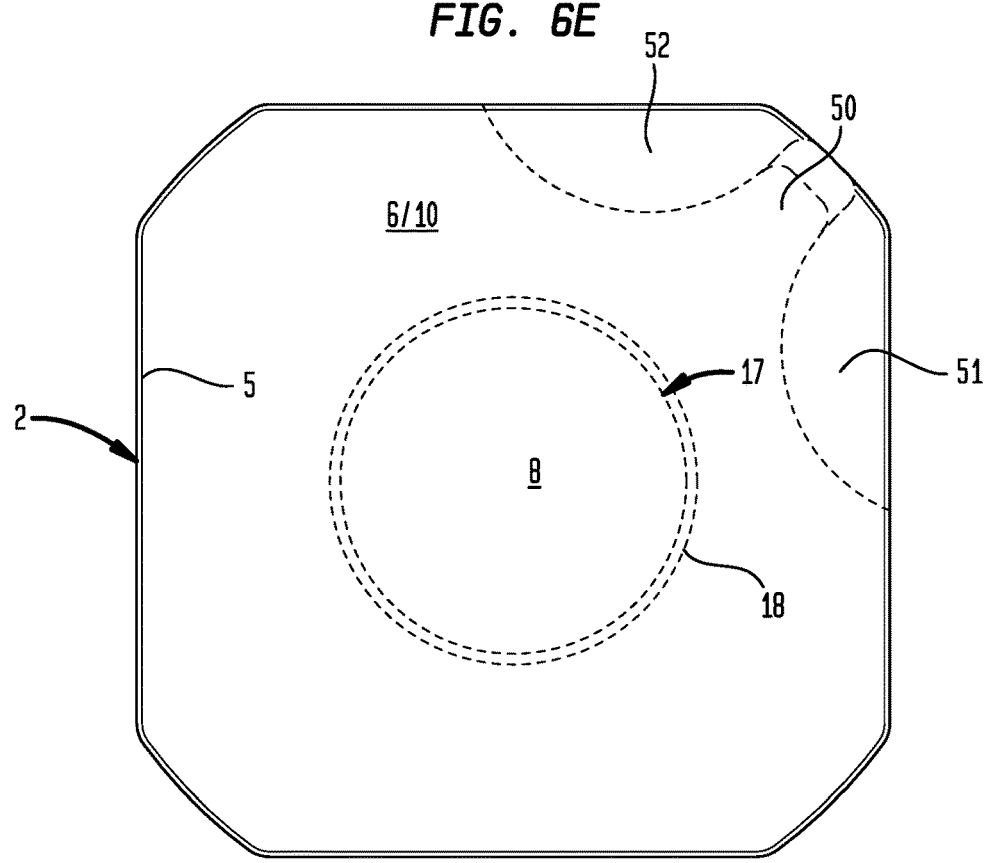
FIG. 6E is a bottom plan view of a particular embodiment of the vessel depicted in FIG. 2.

In a particular embodiment, the container (15) can be reconfigured by removing the bottom portion (14)(shown in the example of FIG. 8A in broken line) to create a bottom aperture element (9) defining a bottom open area (10)(as shown in the examples of FIGS. 5E and 6E) for positioning on a support surface (12). The container (15) can be further altered by removing a top portion (65) to create a top aperture element (7) defining a top open area (8). Elimination of the bottom portion (14) or top portion (65) can be accomplished by cutting, ripping, breaking, or other action to sever the bottom portion (14) or the top portion (65) from the remaining portion of the container (15). This altered container (66) can provide the vessel (2) for use in one or more embodiments, above described.

Now referring primarily to FIG. 1, the bottom aperture element (9) of the thermally regulated enclosure system (1) can be positioned to engage a support surface (12). Typically, the support surface (12) will be the Earth; however, this is not intended to obviate positioning the vessel (2) on other support surfaces (12), such as tables, planters, raised garden beds, or the like, or combinations thereof. The vessel (2) can be positioned on the support surface (12) to surround a protected object (67), such as a plant, garden gnome, or any other object (67) which requires protection from environmental conditions, within the vessel inside space (6). After positioning the vessel (2) on the support surface (12), forcible urging on the stake first ends (35) or the vessel (2) in the direction of the support surface (12) can cause stake second ends (36) to penetrate the support surface (12) to a desired depth. The one or more stakes (4) can penetrate the support surface (12) over part or all of the length of the one or more stakes (4) from the stake second end (36) to the bottom aperture element (9). The closure element (3) can be adjusted between an open condition (20) and a closed condition (21) in relation to the top open area (8) to adjust the level of fluidic communication between the vessel inside space (6) and the environment (16) external to the vessel (2). The elongate member (53) can penetrate or pass through the vessel (2) at a location proximate the top aperture element (7), and traverse the vessel inside space (6) between the first and second recess elements (51)(52) of the grippable vessel handle (50). The member second end (56) can be inserted into the support surface (12) to assist in securing the vessel (2) to the support surface (12).

As can be easily understood from the foregoing, the basic concepts of the present invention may be embodied in a variety of ways. The invention involves numerous and varied embodiments of a thermally regulated enclosure system and methods for making and using such thermally regulated enclosure system including the best mode.

As such, the particular embodiments or elements of the invention disclosed by the description or shown in the figures or tables accompanying this application are not intended to be limiting, but rather exemplary of the numerous and varied embodiments generically encompassed by the invention or equivalents encompassed with respect to any particular element thereof. In addition, the specific description of a single embodiment or element of the invention may not explicitly describe all embodiments or elements possible; many alternatives are implicitly disclosed by the description and figures.

It should be understood that each element of an apparatus or each step of a method may be described by an apparatus term or method term. Such terms can be substituted where desired to make explicit the implicitly broad coverage to which this invention is entitled. As but one example, it should be understood that all steps of a method may be disclosed as an action, a means for taking that action, or as an element which causes that action. Similarly, each element of an apparatus may be disclosed as the physical element or the action which that physical element facilitates. As but one example, the disclosure of an "irrigation element" should be understood to encompass disclosure of the act of "irrigating"—whether explicitly discussed or not—and, conversely, were there effectively disclosure of the act of "irrigating", such a disclosure should be understood to encompass disclosure of an "irrigation element" and even a "means for irrigating." Such alternative terms for each element or step are to be understood to be explicitly included in the description.

In addition, as to each term used it should be understood that unless its utilization in this application is inconsistent with such interpretation, common dictionary definitions should be understood to be included in the description for each term as contained in the Random House Webster's Unabridged Dictionary, second edition, each definition hereby incorporated by reference.

All numeric values herein are assumed to be modified by the tell "about", whether or not explicitly indicated. For the purposes of the present invention, ranges may be expressed as from "about" one particular value to "about" another particular value. When such a range is expressed, another embodiment includes from the one particular value to the other particular value. The recitation of numerical ranges by endpoints includes all the numeric values subsumed within that range. A numerical range of one to five includes for example the numeric values 1, 1.5, 2, 2.75, 3, 3.80, 4, 5, and so forth. It will be further understood that the endpoints of each of the ranges are significant both in relation to the other endpoint, and independently of the other endpoint. When a value is expressed as an approximation by use of the antecedent "about," it will be understood that the particular value forms another embodiment. The term "about" generally refers to a range of numeric values that one of skill in the art would consider equivalent to the recited numeric value or having the same function or result. Similarly, the antecedent "substantially" means largely, but not wholly, the same form, manner or degree and the particular element will have a range of configurations as a person of ordinary skill in the art would consider as having the same function or result. When a particular element is expressed as an approximation by use of the antecedent "substantially," it will be understood that the particular element forms another embodiment.

Moreover, for the purposes of the present invention, the term "a" or "an" entity refers to one or more of that entity unless otherwise limited. As such, the terms "a" or "an", "one or more" and "at least one" can be used interchangeably herein.

Thus, the applicant(s) should be understood to claim at least: i) each of the thermally regulated enclosure systems herein disclosed and described, ii) the related methods disclosed and described, iii) similar, equivalent, and even implicit variations of each of these devices and methods, iv) those alternative embodiments which accomplish each of the functions shown, disclosed, or described, v) those alternative designs and methods which accomplish each of the functions shown as are implicit to accomplish that which is disclosed and described, vi) each feature, component, and step shown as separate and independent inventions, vii) the applications enhanced by the various systems or components disclosed, viii) the resulting products produced by such systems or components, ix) methods and apparatuses substantially as described hereinbefore and with reference to any of the accompanying examples, x) the various combinations and permutations of each of the previous elements disclosed.

The background section of this patent application provides a statement of the field of endeavor to which the invention pertains. This section may also incorporate or contain paraphrasing of certain United States patents, patent applications, publications, or subject matter of the claimed invention useful in relating information, problems, or concerns about the state of technology to which the invention is drawn toward. It is not intended that any United States patent, patent application, publication, statement or other information cited or incorporated herein be interpreted, construed or deemed to be admitted as prior art with respect to the invention.

The claims set forth in this specification, if any, are hereby incorporated by reference as part of this description of the invention, and the applicant expressly reserves the right to use all of or a portion of such incorporated content of such claims as additional description to support any of or all of the claims or any element or component thereof, and the applicant further expressly reserves the right to move any portion of or all of the incorporated content of such claims or any element or component thereof from the description into the claims or vice-versa as necessary to define the matter for which protection is sought by this application or by any subsequent application or continuation, division, or continuation-in-part application thereof, or to obtain any benefit of, reduction in fees pursuant to, or to comply with the patent laws, rules, or regulations of any country or treaty, and such content incorporated by reference shall survive during the entire pendency of this application including any subsequent continuation, division, or continuation-in-part application thereof or any reissue or extension thereon.

Additionally, the claims set forth in this specification, if any, are further intended to describe the metes and bounds of a limited number of the preferred embodiments of the invention and are not to be construed as the broadest embodiment of the invention or a complete listing of embodiments of the invention that may be claimed. The applicant does not waive any right to develop further claims based upon the description set forth above as a part of any continuation, division, or continuation-in-part, or similar application.

I claim:

1. An apparatus, comprising:
a vessel having a top aperture element defining a top open area configured to engage a closure element opposite a bottom aperture element defining a bottom open area positionable on a support surface, said vessel having a vessel internal surface enclosing a vessel inside space communicating with said top open area and said bottom open area;
a closure element removably engaged to said top aperture element; and
one or more stakes detachably fastened to said bottom aperture element, wherein each of said one or more stakes has a stake first end and a stake second end, said stake first end including a first bifurcate member opposite a second bifurcate member defining a longitudinal space configured to receive said bottom aperture element between said first and second bifurcate members; and
one or more piercing elements, each of said one or more piercing elements having a shaft disposed between a fixation end and a piercing end configured to transverse said first bifurcate member and said second bifurcate member to secure said bottom aperture element within said longitudinal space between said first and second bifurcate members.

2. The apparatus of claim 1, further comprising a flexure element coupled to said first bifurcate member which flexes to increase or diminish said longitudinal space between said first and second bifurcate members, wherein said fixation end connected in fixed relation to said first bifurcate member disposes said piercing end toward said second bifurcate member, said second bifurcate member having a hole through which said piercing end passes upon diminishment of said longitudinal space.

3. The apparatus of claim 2, wherein said piercing end tapers inwardly from a piercing end base to a piercing end point.

4. The apparatus of claim 3, wherein said piercing end base or said hole resiliently deforms to allow forcible urging of said piercing end base through said hole to fixedly engage said second bifurcate member to said first bifurcate member in fixed relation.

5. The apparatus of claim 4, wherein said piercing end base or said hole resiliently deforms to allow forcible urging of said piercing end base through said hole to disengage said second bifurcate member to dispose said first bifurcate member in movable flexed relation to said second bifurcate member.

6. The apparatus of claim 5, wherein said piercing end is detachably engaged to said piercing element shaft.

7. The apparatus of claim 1, further comprising a neck element coupled to said top aperture element, wherein said neck element configured to matingly engage a closure element.

8. The apparatus of claim 7, further comprising a first spiral thread affixed to an external surface of said neck element, a second spiral thread affixed to an internal surface of said closure element, wherein said first spiral thread rotatingly matingly engages said second spiral thread.

9. The apparatus of claim 7, further comprising a tether element having a tether first end coupled to said vessel and a tether second end coupled to said closure element.

10. The apparatus of claim 7, further comprising a closure movement element coupled to said tether element, said closure movement element responsive to changes in temperature to move said closure element in relation to said top aperture between a closed condition and an open condition.

11. The apparatus of claim 10, wherein said closure movement element comprises a first layer bonded to a second layer of materials having different coefficients of thermal expansion.

12. The apparatus of claim 1, further comprising an inlet element coupled to said vessel, said inlet element configured to retain an irrigation element.

13. The apparatus of claim 12, wherein said irrigation element includes a tubular member configured to pass through said inlet element into said vessel inside space.

14. The apparatus of claim 13, further comprising a fluid flow restrictor coupled to said tubular member, said fluid flow restrictor removably affixable to said inlet element.

15. An apparatus, comprising:
a vessel having a top aperture element defining a top open area opposite a bottom aperture element defining a bottom open area positionable on a support surface, said vessel having a vessel internal surface enclosing a vessel inside space communicating with said top open area and said bottom open area;
a closure element removably engaged to said top aperture element;

a tether element having a tether first end coupled to said vessel and a tether second end coupled to said closure element; and a closure movement element coupled to said tether element, said closure movement element responsive to changes in temperature to move said closure element in relation to said top aperture element between a closed condition and an open condition.

16. The apparatus of claim 15, wherein said closure movement element comprises a first layer bonded to a second layer of materials having different coefficients of thermal expansion.

17. The apparatus of claim 15, further comprising an inlet element coupled to said vessel, said inlet element configured to retain an irrigation element.

18. The apparatus of claim 17, wherein said irrigation element includes a tubular member configured to pass through said inlet element into said vessel inside space.

19. The apparatus of claim 18, further comprising a fluid flow restrictor coupled to said tubular member, said fluid flow restrictor removably affixable to said inlet element.

20. The apparatus of claim 15, further comprising one or more stakes fastened to said bottom aperture element.

* * * * *